United States Patent
Sauser et al.

(10) Patent No.: US 8,650,037 B2
(45) Date of Patent: Feb. 11, 2014

(54) BIFURCATABLE ROAD BUILDING MATERIAL APPARATUS AND METHOD

(75) Inventors: Edwin Sauser, Monticello, IA (US); Alan P. Eisner, Meguon, WI (US)

(73) Assignee: Terex USA, LLC, Westport, CT (US)

( * ) Notice: Subject to any disclaimer, the term of this patent is extended or adjusted under 35 U.S.C. 154(b) by 1449 days.

(21) Appl. No.: 11/765,334

(22) Filed: Jun. 19, 2007

(65) Prior Publication Data

US 2008/0044264 A1   Feb. 21, 2008

Related U.S. Application Data

(60) Provisional application No. 60/805,548, filed on Jun. 22, 2006, provisional application No. 60/867,713, filed on Nov. 29, 2006.

(51) Int. Cl.
  *G06Q 10/00* (2012.01)
  *G06Q 90/00* (2006.01)

(52) U.S. Cl.
  USPC .......................................... 705/1.1; 705/500

(58) Field of Classification Search
  USPC .................................... 705/1.1, 500
  See application file for complete search history.

(56) References Cited

U.S. PATENT DOCUMENTS

| 3,073,536 | A | | 1/1963 | Quinn |
| 3,409,235 | A | * | 11/1968 | Quinn ............................ 241/76 |
| 3,563,477 | A | | 2/1971 | Schroeder |
| 4,585,179 | A | | 4/1986 | Tsuji et al. |
| 4,655,402 | A | | 4/1987 | Desourdy |
| 5,647,545 | A | | 7/1997 | Conner |
| 6,935,587 | B2 | | 8/2005 | Brock et al. |
| 7,774,133 | B2 | * | 8/2010 | Schwarzmann .............. 701/202 |
| 2010/0152998 | A1 | * | 6/2010 | Schwarzmann .............. 701/200 |

OTHER PUBLICATIONS

Ramberg, Kenneth, Fewer Trucks Improve the Environment, Oct. 2004, Confederation of Swedish Enterprise, Transport & Infrastructure, pp. 1-14.*

* cited by examiner

*Primary Examiner* — Jonathan Ouellette
*Assistant Examiner* — Michael Thompson
(74) *Attorney, Agent, or Firm* — Simmons Perrine Moyer Bergman PLC

(57) ABSTRACT

A bifurcatable mobile rock crusher and method of transporting the same comprising providing a first segment which is separately towable on the highway and providing a second segment which is separately towable on the highway, where each segment is configured to be combined into one unit and towed as a unit on the highway.

19 Claims, 4 Drawing Sheets

BIFURCATABLE ROAD BUILDING MATERIAL APPARATUS AND METHOD

CROSS REFERENCE TO RELATED APPLICATIONS

This application claims the benefit of a provisional application filed on Jun. 22, 2006, and having Ser. No. 60/805,548 and a provisional application filed on Nov. 29, 2006 having Ser. No. 60/867,713. This application also relates to co-pending application filed on even date herewith entitled "MOBILE AGGREGATE CRUSHING SYSTEM AND METHOD".

BACKGROUND OF THE INVENTION

This invention relates to rock crushing plants and other road aggregate or building material processing systems. More specifically, this invention relates to mobile crushing plants which are capable of being transported over public highways.

Several techniques and numerous equipment arrangements for moving rock crushing plants from one location to another are known from the prior art. Particularly relevant to the present invention is the use of modular rock crushing systems where the components of the entire system can be broken down and transported via semi-trucks to another location. Typically, the modular rock crushing system would be designed to be broken down to travel on the public roadways of a state which has the most restrictive size and weight limitations.

While such prior art modular mobile rock crushing systems have enjoyed considerable success in the past, they do have some drawbacks. Such modular mobile rock crushing system designs often resulted in using more trucks to move a rock crushing plant than would be legally required if the plant were being moved within states or between states that have size and weight restrictions higher than the aforementioned most restrictive size and weight restrictions. In some jurisdictions, a series of trailers can be simultaneously pulled behind one semi-truck. However, some states either prohibit or regulate towing multiple trailers arranged so that they have a capability for substantial angular articulation between the trailers.

One prior art system is described in U.S. Pat. No. 3,563,477 to Schroeder. This patent describes an oversized portable bulk material processing plant which comprises two sections which can be joined together into a unitary oversized vehicle or which may be separated and FORMED into individual vehicles for independent highway travel. The design in Schroeder requires the addition of a set of wheels to FORM a second trailer and when combined, the unified structure is oversized. This attachment of a set of wheels would involve considerable time, effort and skill to accomplish.

Consequently, a need remains in the industry for an improved modular mobile rock crushing system which has flexibility to easily accommodate the various regulations in several jurisdictions and thereby reduces wasted energy and wear and tear of semi-trucks when more of such trucks are used to move a system than would be legally required. The primary objective of this invention is to meet this need.

SUMMARY OF THE INVENTION

More specifically, an object of the invention is to provide a bifurcatable aggregate or road building material system which provides a screen, crusher, trommel or a road building material handling apparatus which is disposed on two trailers which could be combined and towed as a single trailer (without an intermediate articulation point) behind one semi-truck or split into two to be transported behind two independent semi-trucks.

Another object of the present invention is to provide a method of moving road building material handling systems from one state to another where differing numbers of semi-trucks are used in different states.

Yet another object of the invention is to provide rapid switching between a single semi-truck tow vehicle to multiple semi-truck tow vehicles for any one given road building material handling apparatus, especially without the need for adding a set of wheels to form a second trailer.

Other and further objects of the invention, together with the features of novelty appurtenant thereto, may appear in the detailed description and the drawings.

The present invention comprises a road building material handling apparatus which is configured to be bifurcated into two segments, each of which is configured to be towed by an independent tow vehicle or in the alternative, each segment could be combined into a single combined unit which is towed by a single tow vehicle.

BRIEF DESCRIPTION OF THE DRAWINGS

In the following description of the drawings, in which like reference numerals are employed to indicate like parts in the various views.

DETAILED DESCRIPTION OF THE DRAWINGS

Figure 1:
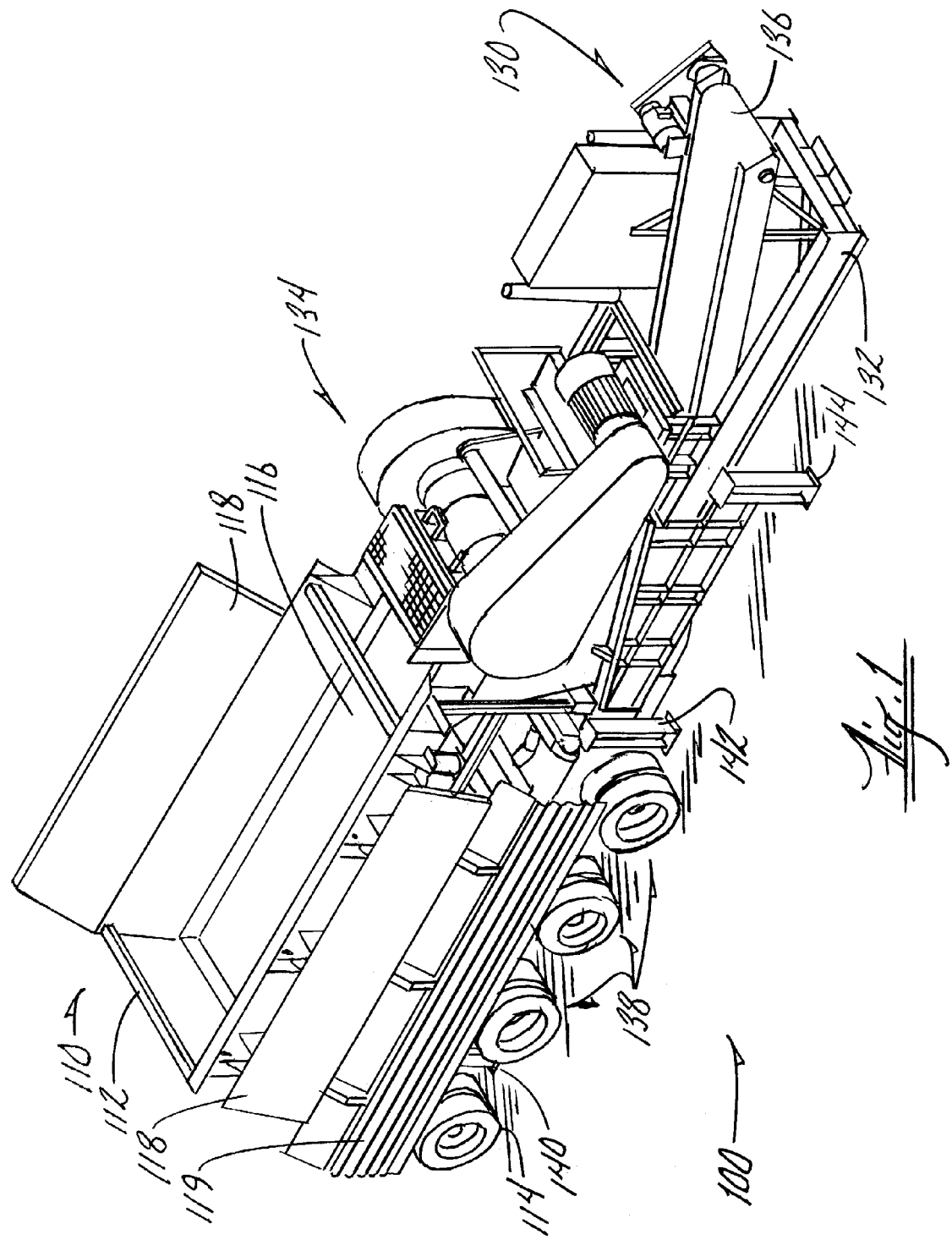
FIG. 1 is a perspective view of a mobile jaw rock crusher of this invention.

Referring now to the drawings, where like numerals refer to like matter throughout, and referring in greater detail, attention is first directed to FIG. 1, where there is shown a bifurcatable crusher 100 having a material feed section 110 disposed at a rear end of bifurcatable crusher 100 and a rock crusher section 130 which is disposed at the front end of the combined bifurcatable crusher 100. Material feed section 110 includes a material feeder section input hopper 112 with material feeder section conveyor 116 and material feeder section folding wings 118, which are used to extend the size of the dumping zone for the material feeder section input hopper 112. Folding stowable trailer misfeed protecting cover 119 is used to protect the trailer from damage caused by misfed material which is intended for the material feeder section input hopper 112, but falls outside the dumping zone and otherwise might strike the trailer. Folding stowable trailer misfeed protecting cover 119 can be folded and stowed during traveling as shown in the figures.

Material feed section 110 is shown with material feeder section trailer wheels 114. Rock crusher section 130 is shown with rock crusher section frame 132, rock crusher 134, rock crusher output conveyor 136, rock crusher trailer wheels 138, rock crusher trailer rear jack 140, rock crusher trailer middle jack 142, and rock crusher trailer front jack 144. When the bifurcatable crusher 100 is a unified structure as shown in FIG. 1, it functions as a rock crusher where rocks, concrete and other materials known to be fed into a rock crusher are dropped into material feeder section input hopper 112 and fed by the material feeder section conveyor 116 into the rock crusher 134, where they are processed and output on rock crusher output conveyor 136. The bifurcatable crusher 100 is towable as a single non-intermediately articulating trailer.

Figure 2:
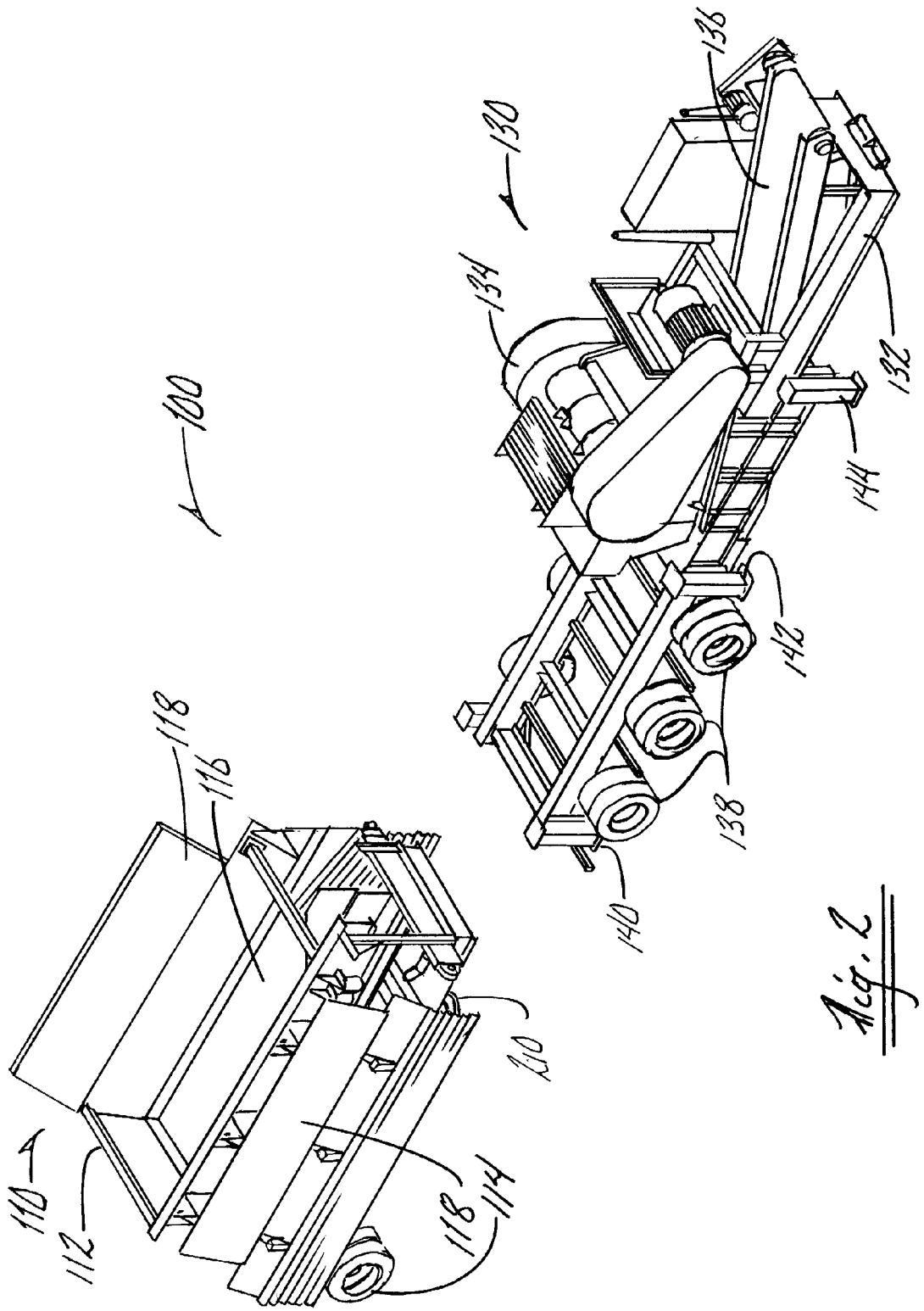
FIG. 2 is a partially exploded view of a mobile jaw rock crusher of FIG. 1.

Now referring to FIG. 2, there is shown the bifurcatable crusher 100 after it has been divided into separate material feed section 110 and rock crusher section 130. FIG. 2 shows a material feeder trailer jack 210 in a deployed position. Material feeder trailer jack 210 is preferably both retractable (length adjustable) and pivotable via hydraulic power.

Figure 3:
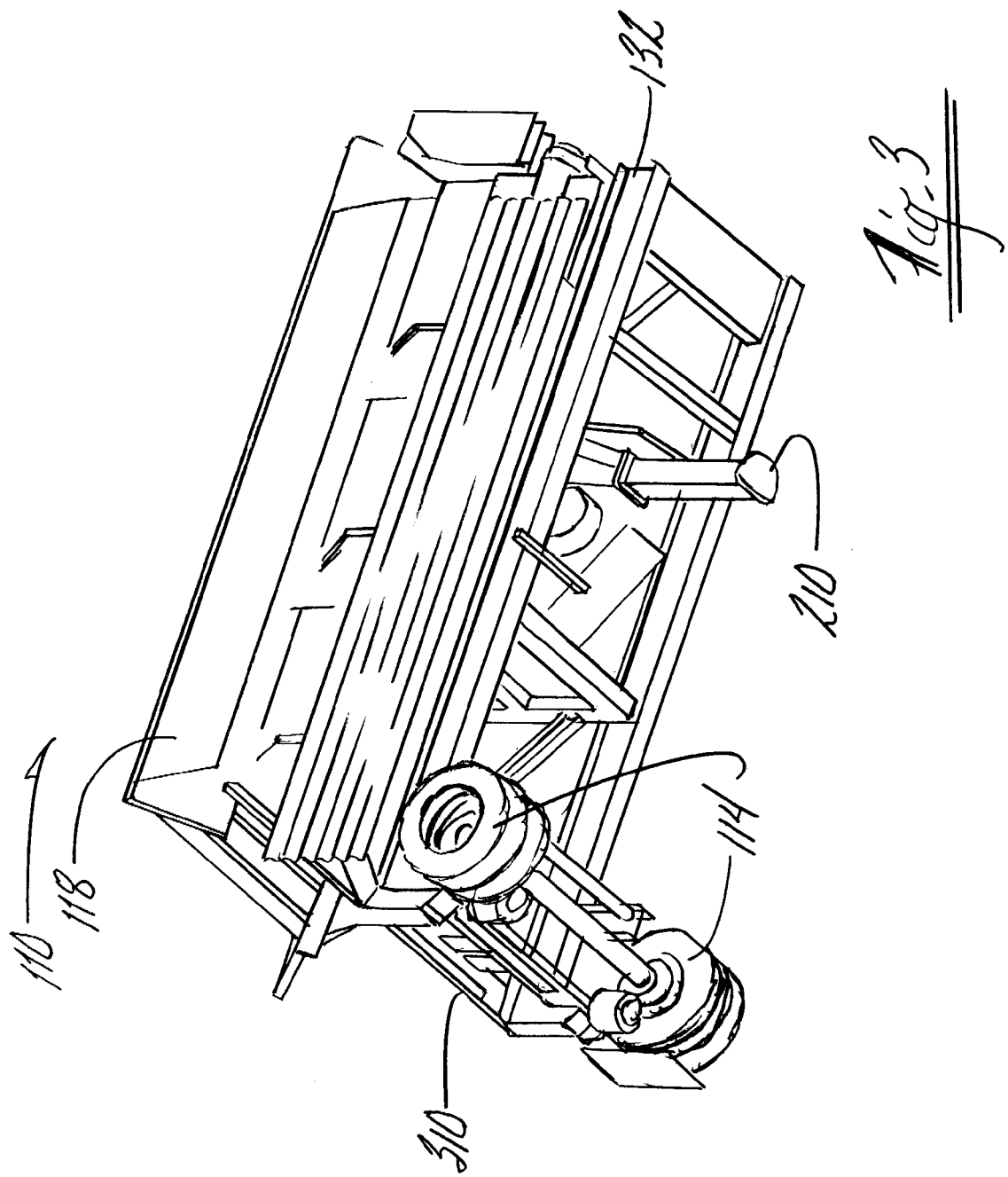
FIG. 3 is a perspective view of an underside portion of the mobile jaw rock crusher of FIGS. 1 and 2, where a stowable jack is shown in the deployed position.

Now referring to FIG. 3, there is shown a perspective view looking upward at the bottom of the material feed section 110, which shows the material feeder trailer jack 210 in a deployed position, and also shows the material feeder section gas-powered hydraulic pump 310, which is intended to provide hydraulic power to operate portions of the material feed section 110, such as the material feeder section folding wings 118, the folding stowable trailer misfeed protecting cover 119, folds material feeder trailer jack 210 and extends material feeder trailer jack 210.

Figure 4:
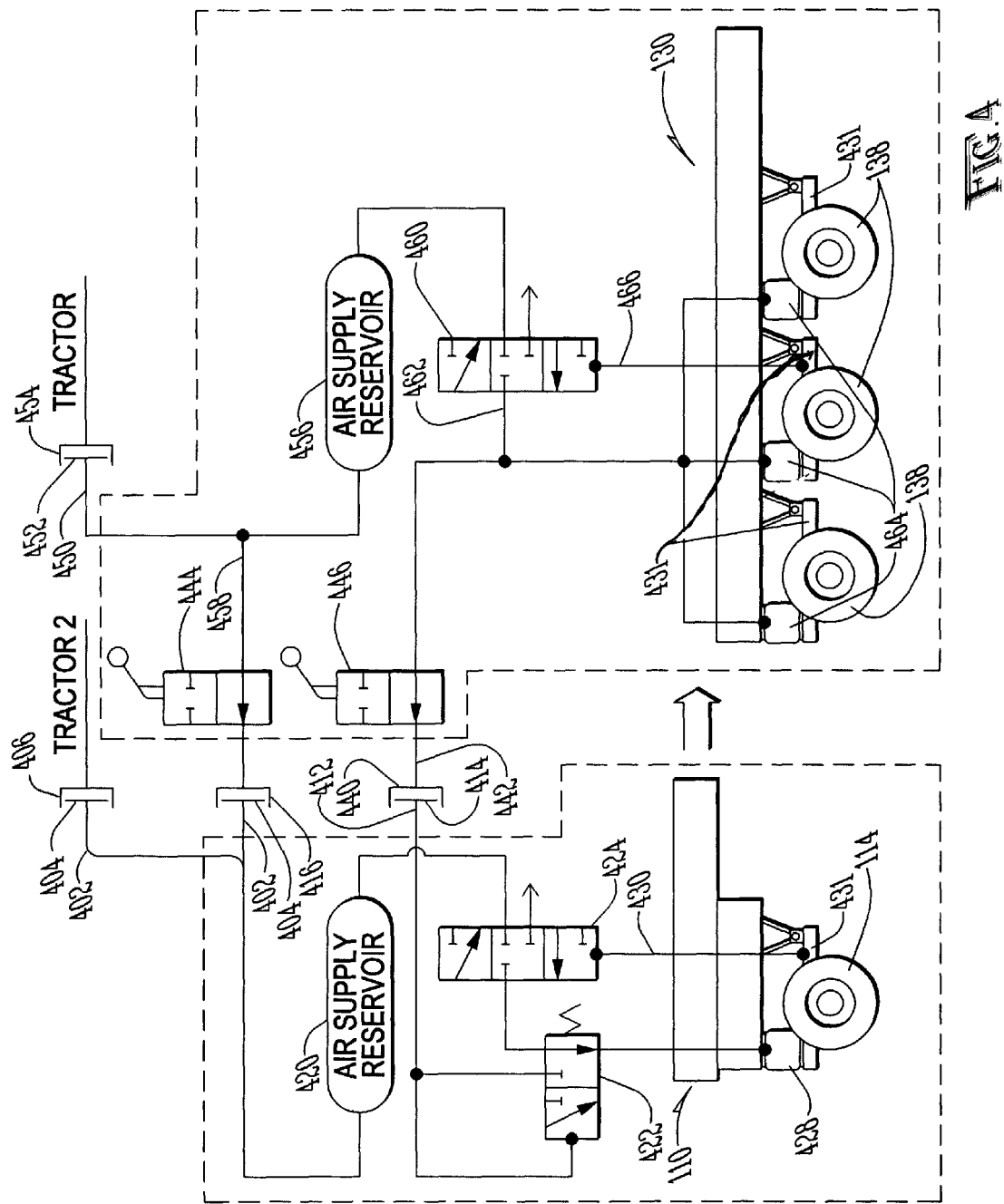
FIG. 4 is a schematic diagram of the pneumatic system of the present invention.

Now referring to FIG. 4, there is shown a pneumatic schematic diagram which is divided into two sections; the right section in the dashed lines represents the pneumatic structure on the rock crusher section 130, while the left side of FIG. 4 in the dashed line enclosure represents the pneumatic structure on the material feed section 110.

Referring to the left section of FIG. 4, there is shown an independent height adjustable air supply line 402 and an independent height adjustable air supply line quick coupler component 404. FIG. 4 shows two independent lines of differing length. In an alternate embodiment, one line could be used as the connection between independent height adjustable air supply line quick coupler component 404 and tractor-to-trailer air supply line quick connect coupler component 406. This connection would not occur at the same time as a connection between independent height adjustable air supply line quick coupler component 404 and inter-section independent suspension height quick connect component 416. Independent height adjustable air supply line quick coupler component 404 and tractor-to-trailer air supply line quick connect coupler component 406 may be standard airline quick connect or proprietary quick connects if desired. Independent height adjustable air supply line 402 provides air to feeder air supply reservoir 420, which provides air to the brake system (if desired) and to feeder suspension height valve 424, which adds or exhausts air to the feeder suspension air bag 428 via feeder section independent to common suspension control valve 422. Coupler 414 and inter-section common suspension height quick connect component 440 provide air to common supply line 412 which provides air to feeder section independent to common suspension control valve 422 to shuttle feeder section independent to common suspension control valve 422 and overrides feeder suspension height valve 424 and provides pressure to feeder suspension air bag 428 resulting in a common pressure in all air bags. Feeder suspension height valve 424 could be an industry standard height control valve or any suitable substitute. Feeder section independent to common suspension control valve 422 could be a pilot valve, manual valve or any suitable substitute, which diverts or directs air pressure either from valve 424 (for independent travel) or from common supply line 412. Feeder suspension height valve 424 is coupled to feeder section independent to common suspension control valve 422 and via feeder suspension linkage 430 and suspension arm 431.

On the right side of FIG. 4, there is shown a tractor-to-trailer air supply line quick connect component 454 coupled to a crusher section main air supply quick connect component 452 and via crusher section main air supply line 450 to crusher section air supply reservoir 456, which provides air to the brake system (not shown) and to crusher section suspension height valve 460, which is coupled to a suspension arm 431 by suspension linkage 466.

Crusher section suspension height valve 460 is coupled via crusher section suspension supply line 462 to the various crusher section suspension air bags 464 and also to manual shut-off 446 and via inter-section common suspension height supply line 442 to inter-section common suspension height quick connect component 440, which couples it to feeder section independent to common suspension control valve 422 as discussed above to provide for common suspension height control when material feed section 110 and rock crusher section 130 are combined. The air suspension system of the present invention can be designed so that only one axle is monitored for height control and the other axles only are only pressure controlled. The primary purpose would be focused on an equalized axle load, not equal height control. The actual lengths of the air bags would vary due to frame deflection, frame slope, or ground level.

Crusher section main air supply line 450 is coupled via crusher section independent suspension height supply line 458 to inter-section independent suspension height manual shut-off 444, which is coupled to inter-section independent suspension height quick connect component 416.

The material feed section 110 and rock crusher section 130 can be used and then separated using the following process:

1. Towing tractor is attached to front of combined chassis; i.e., to front of rock crusher section 130 and airlines are attached at crusher section main air supply quick connect component 452.

2. Air system, including both feeder air supply reservoir 420 and crusher section air supply reservoir 456, is charged from towing tractor.

3. Disconnect rear chassis suspension air lines, both independent height adjustable air supply line 402 and common supply line 412 and electrical lines; this thereby locks the rear axle and applies the brakes.

4. Disconnect mechanical latch of some type to enable relative movement between the chassis.

5. Tow rock crusher section 130 chassis forward, sliding under material feed section 110 chassis until contact with a slide stop.

6. Start material feeder section gas-powered hydraulic pump 310 and unfold material feeder trailer jack 210 to vertical position.

7. Extend material feeder trailer jack 210 to lift material feed section 110 chassis above slide stop.

8. Tow rock crusher section 130 chassis away from material feed section 110 chassis.

9. Back the feeder tow tractor into position under material feed section 110 chassis.

10. Use material feeder trailer jack 210 to adjust height to allow engagement with towing tractor.

11. Continue backing tractor into material feed section 110 chassis until king pin locks engagement.

12. Hydraulically retract and fold material feeder trailer jack 210 and turn off material feeder section gas-powered hydraulic pump 310.

13. Attach air and electric lines to towing tractor.

14. Turn manual rear axle brake valve to "off" position. (In some embodiments, this step may be omitted.)

In an alternate embodiment, to separate the feeder from the crusher, leaving the crusher in place, you could repeat steps 1 through 3, then release the brakes in axle 114 while retaining pressure in the air bag 428, then release the mechanical latch, thereby allowing relative movement aided by a hydraulic or winch-type system to move chassis 110 backwards to the mechanical stop.

Also, rollers could be used to further facilitate relative movement of the two chassis.

The terms "road building materials" are used throughout this description as an example of a common use of aggregate materials. It should be understood that the terms "road building materials" are intended to include aggregate materials, irrespective of the actual use to which such aggregate materials may be put. Similarly, the terms "rock crusher" are used as a common example of the use of a crusher; however, the terms "rock crusher" are intended to include any crusher, whether it is rock, concrete, or any other material that is being crushed.

It will be understood that certain features and sub-combinations are of utility and may be employed without reference to other features and sub-combinations. This is contemplated by and is within the scope of the claims.

Since many possible embodiments may be made of the invention without departing from the scope thereof, it is understood that all matter herein set forth or shown in the accompanying drawings is to be interpreted as illustrative and not in a limiting sense.

I claim:

1. A method of sequentially transporting a rock crusher on a plurality of highways where each highway has differing regulations with respect to the transportation of trailers thereon, comprising the steps of:
   determining vehicle size restrictions for a plurality of different highways each having differing vehicle restrictions and determining an origin and a destination and planning a route from the origin to the destination where a total amount of tow vehicle mileage is minimized;
   providing, within the political boundaries of a first state, an aggregate processing apparatus with a first plurality of wheels so as to be legally towable on a first highway, the aggregate processing apparatus being configured with an inlet opening for aggregate to be handled and a discharge opening for discharging processed aggregate;
   providing, within the political boundaries of said first state, a material feed structure with a second plurality of wheels so as to be legally towable on said first highway;
   on said first highway, pulling said aggregate processing apparatus from a first tow end with a first truck in a first direction extending from said first plurality of wheels to said first tow and simultaneously pulling said material feed structure from a second tow end with a second truck, in a second direction extending from said second plurality of wheels to said second tow end;
   translating and then mating said aggregate processing apparatus with respect to said material feed structure and thereby forming a bifurcatable unified structure which is in a unified configuration to perform aggregate material processing, and is larger than is permissible to be legally towed on said first highway in said first state and which unified structure is without a capability of substantial intermediate angular articulation between the aggregate processing apparatus and the material feed structure and where said first direction and second direction are oriented in a common direction; and
   towing said unified structure in said unified configuration on a second highway which legally permits larger loads than said first highway;
   where said unified structure in said unified configuration can be operated for processing aggregate material without separating; said aggregate processing apparatus and said material feed structure and while maintaining said first direction and said second direction in said common direction.

2. The method of claim 1 wherein said second highway is located within the geographic boundaries of a second state.

3. The method of claim 1 wherein said aggregate processing apparatus further comprises a crusher pneumatic system thereon for providing a flexible support suspension with axle loading compensation.

4. The method of claim 3 wherein said material feed structure further comprises a material feed structure pneumatic system thereon which is configured for independent operation and control with respect to said crusher pneumatic system, and is further configured to be alternatively controlled by a unified controller which is configured to simultaneously control portions of said crusher pneumatic system and said material feed structure pneumatic system when said aggregate processing apparatus and said material feed structure are mated into said unified structure.

5. The method of claim 4 wherein said aggregate processing apparatus is a road building material handling apparatus and further comprising the steps of deploying a retractable stand coupled to one of the road building material handling apparatus and the material feed structure to provide support when not mated so as to form the unified structure.

6. The method of claim 1 wherein said step of towing said unified structure is accomplished using an identical number of towed wheels as used with respect to the step of towing said aggregate processing apparatus with a first truck and simultaneously towing said material feed structure with a second truck, where said towed wheels do not include any wheels on any truck.

7. The method of claim 6 wherein said step of towing said unified structure is accomplished without incorporating additional wheels and axles and without removing any wheels and axles.

8. The method of claim 1 further comprising the steps of:
   breaking apart the unified structure by separating the aggregate processing apparatus from the material feed structure without addition or removal of any running gear.

9. A method of claim 1 wherein said step of translating and mating further comprises the step of coupling an air line link between an otherwise independent air suspension system on the material feed structure with wheels and the otherwise independent air suspension system on the aggregate processing apparatus so that a common air pressure is applied to all air suspension bags of the unified structure.

10. A method of claim 1 further comprising the steps of:
    determining vehicle size restrictions for a plurality of different highways each having differing vehicle restrictions; and
    determining an origin and a destination and planning a route from the origin to the destination where a total amount of tow vehicle mileage is minimized.

11. A method of sequentially transporting an aggregate processing apparatus on a plurality of highways where each highway has differing regulations with respect to the transportation of trailers thereon, comprising the steps of:
    determining vehicle size restrictions for a plurality of different highways each having differing vehicle restrictions and determining an origin and a destination and planning a route from the origin to the destination where a total amount of tow vehicle mileage is minimized;
    providing, within the political boundaries of a first state, an aggregate processing apparatus with wheels so as to be legally towable on a first highway, the aggregate processing apparatus being configured with an inlet opening for aggregate to be handled and a discharge opening for discharging processed aggregate;

providing, within the political boundaries of said first state, a material feed structure with wheels so as to be legally towable on said first highway;

on said first highway, towing said aggregate processing apparatus with a first truck and towing said material feed structure with a second truck;

translating and then mating said aggregate processing apparatus with respect to said material feed structure and thereby forming a bifurcatable unified structure with a unified plurality of wheels, which is unified structure is larger than is permissible to be legally towed on said first highway in said first state and which unified structure is without a capability of substantial intermediate angular articulation between the aggregate processing apparatus and the material feed structure;

towing said unified structure on a second highway which legally permits larger loads than said first highway;

where said unified structure is configured and oriented so that it can be operated for processing material between and without doing one of:

separating; said aggregate processing apparatus and said material feed structure; and changing a relative orientation of said aggregate processing apparatus and said material feed structure; and wherein said aggregate processing apparatus further comprises a crusher pneumatic system thereon for providing a flexible support suspension with axle loading compensation.

12. The method of claim 11 wherein said material feed structure further comprises a material feed structure pneumatic system thereon which is configured for independent operation and control with respect to said crusher pneumatic system, and is further configured to be alternatively controlled by a unified controller which is configured to simultaneously control portions of said crusher pneumatic system and said material feed structure pneumatic system when said aggregate processing apparatus and said material feed structure are mated into said unified structure.

13. The method of claim 12 wherein said aggregate processing apparatus is a road building material handling apparatus and further comprising the steps of deploying a retractable stand coupled to one of the road building material handling apparatus and the material feed structure to provide support when not mated so as to form the unified structure.

14. The method of claim 11 wherein said step of towing said unified structure is accomplished using the unified plurality of wheels which comprises the same towed wheels as used with respect to the step of towing said aggregate processing apparatus with a first truck and towing said material feed structure with a second truck.

15. The method of claim 14 wherein said step of towing said unified structure is accomplished without incorporating additional wheels and axles and without removing any wheels and axles.

16. The method of claim 11 further comprising the steps of:

breaking apart the unified structure by separating the aggregate processing apparatus from the material feed structure without addition or removal of any running gear.

17. A method of claim 11 wherein said step of translating and mating further comprises the step of coupling an air line link between an otherwise independent air suspension system on the material feed structure with wheels and the otherwise independent air suspension system on the aggregate processing apparatus so that a common air pressure is applied to all air suspension bags of the unified structure.

18. A method of claim 11 further comprising the steps of:

determining vehicle size restrictions for a plurality of different highways each having differing vehicle restrictions; and determining an origin and a destination and planning a route from the origin to the destination where the total amount of tow vehicle mileage is minimized.

19. A method of transporting a system for processing aggregate material comprising the steps of:

providing, within the political boundaries of a first state, an aggregate processing apparatus with a first plurality of wheels so as to be legally towable on a first highway, the aggregate processing apparatus being configured with an inlet opening for aggregate to be handled and a discharge opening for discharging processed aggregate;

providing, within the political boundaries of said first state, a material feed structure with a second plurality of wheels so as to be legally towable on said first highway;

on said first highway, towing said aggregate processing apparatus with a truck and towing said material feed structure with a truck;

translating and then mating said aggregate processing apparatus with respect to said material feed structure and thereby forming a bifurcatable unified structure which is larger than is permissible to be legally towed on said first highway in said first state and which unified structure is without capability of substantial intermediate angular articulation between the aggregate processing apparatus and the material feed structure;

towing, using of said first plurality of wheels and said second plurality of wheels, said unified structure on a second highway which legally permits larger loads than said first highway;

where said unified structure is configured and oriented so that it can be operated for processing material between and without doing one of;

separating; said aggregate processing apparatus and said material feed structure; and changing a relative orientation of said aggregate processing apparatus and said material feed structure.

* * * * *